June 18, 1968
G. JÄCKERING
3,388,733
PROCESS AND APPARATUS FOR THE SEPARATION OF SUSPENSIONS
Filed June 17, 1963
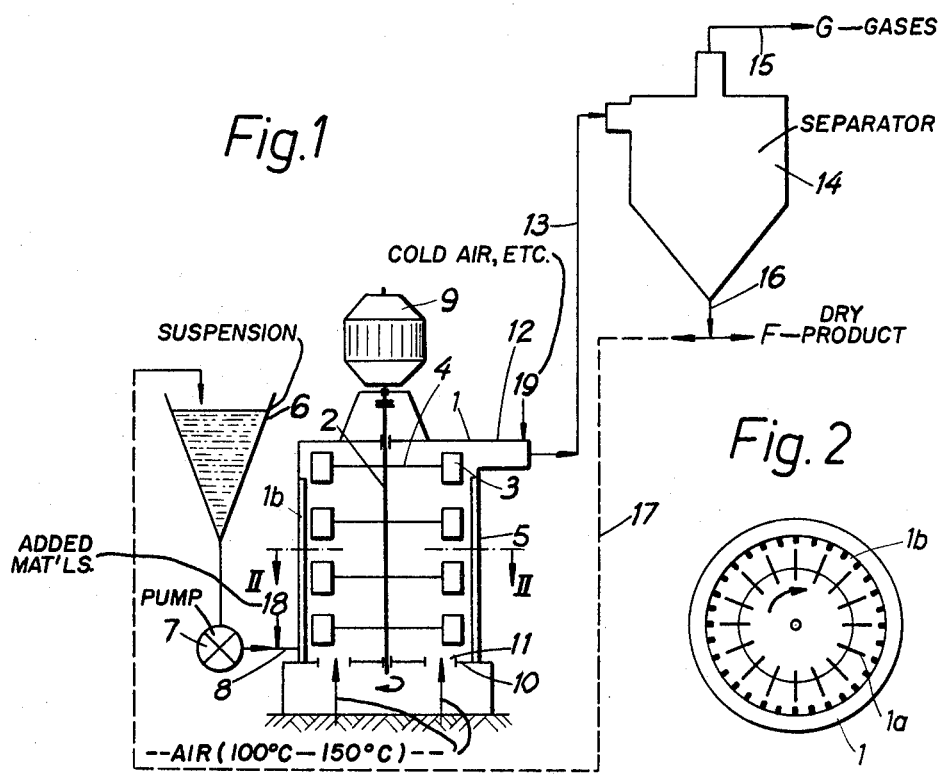
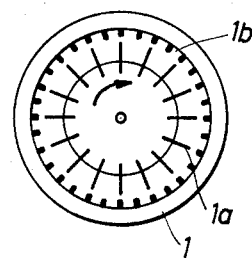
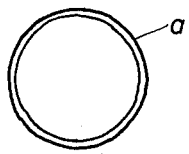
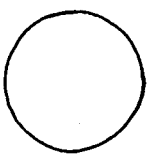
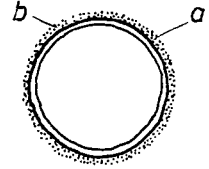
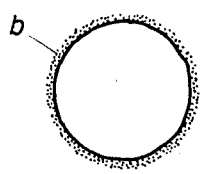
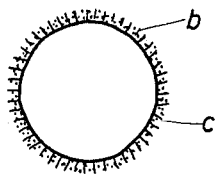
INVENTOR.
GÜNTER JÄCKERING
BY
Toulmin & Toulmin
Attorneys

United States Patent Office 3,388,733
Patented June 18, 1968

3,388,733
PROCESS AND APPARATUS FOR THE
SEPARATION OF SUSPENSIONS
Günter Jäckering, Vorsterhauserweg 22d,
Hamm in Westphalia, Germany
Filed June 17, 1963, Ser. No. 288,213
1 Claim. (Cl. 159—4)

ABSTRACT OF THE DISCLOSURE

For separating solid particles suspended in a liquid, the process provides for breaking up the suspension in a gaseous vortex into solid particles with liquid film adhering thereto, and flash heating the particles to evaporate the film therefrom; the apparatus provides a closed container that surrounds a bladed rotor generating the vortices, inlets and outlets for the gases and the suspending liquid, and for withdrawing the gases and solid particles.

---

The present invention relates to the separation of suspensions consisting of solid particles in a liquid, more particularly, to the mechanical separation of the solid particles from the liquid and the evaporation of liquid films adhering to the particles so as to obtain dry solid particles.

In many industrial processes suspensions of solids in liquids are obtained which may include either the desired end product or various by-products. The utility of such suspensions often depends on the economic feasibility of separating the liquid and solid phases. For this purpose, it has been customary to use various evaporation processes carried out either at atmospheric or sub-atmospheric pressures. However, these evaporation procedures were inherently disadvantageous since the evaporators necessary for this purpose were necessarily of a large capacity to provide a yield sufficient for industrial processes. Further, such evaporators required suitable auxiliary apparatus. This was especially true of spraying towers wherein the exhausted air had a temperature of about 120–180° C.

Rotary drum dryers which operated on the thin film principle were also employed but had the disadvantage of limited use particularly in the food production industry because of the tendency for deposits and accumulations to be formed within the dryers and the various temperature fluctuations encountered in such dryers. In order that various nutritional values of foods were not impaired in the production of foodstuffs, it was necessary that such foodstuffs be heated for only limited periods of time and below certain temperatures.

Attempts have also been made to use heated mills for drying moisture-containing foodstuffs but such suspensions could not be successfully dried in tubular, hammer, or impact mills because of the tendency to gum up and form deposits within the mills.

It is therefore the principal object of the present invention to provide a novel and improved process and apparatus for the separation and removal of solids suspended in liquids.

It is a further object of the present invention to provide a process and apparatus for the mechanical separation of solids suspended in liquids wherein the apparatus occupies a minimum of space and the process can be carried out in a short period of time.

After intensive investigation, it was found that suspensions containing up to 60% liquid can be dried in a single treatment if the suspension is first atomized into tiny fog-like droplets and then followed by sudden and abrupt flash heating to dry the particles by evaporation of liquids adhering thereto. Such a process could be carried out, although not very efficiently, by atomization of the suspension in a spraying tower.

The present invention, however, provides for carrying out this process in a minimum of space by utilizing a high speed vortex separator wherein vortices are formed in the atmosphere within the separator and the vortices are subjected to continued impulse changes in direction and magnitude. Such a vortex will separate the fine solid particles from the suspension because of the unequal distributions of energy throughout. By delivering heat to this vortex, after the particles have been separated, the particles will undergo sudden and abrupt flash heating. Since this thermal energy will act from all sides upon spherical microscopic particles the heat will contact the solid particles in these globules in a minimum of time and with unexpected results. These results will be produced by flat vortices following rapidly after one another in consequence of the rotation of the scoop blades within the internally ribbed stator. In one form of this invention the rotor operates in a space 750 mm. in diameter while the ribs and the spaces between them measure 6 mm. If the rotor of such an apparatus is given 2100 revolutions per minute, about 82,000 flat vortices per minute will be produced.

During the separation process, the solid particles entrained in the vortex will carry most of the liquid in the form of films adhering to the particles. These relatively thin liquid films are quickly penetrated by the hot gases entering into the vortex and the films will be quickly evaporated. As a result, dried solid particles are produced.

Other objects and advantages of the present invention will be readily apparent upon reference to the accompanying description when taken in conjunction with the following drawings wherein:

FIGURE 1 is a schematic vertical sectional view that illustrates diagrammatically one form of apparatus which can be used for carrying out the present process;

FIGURE 2 is a schematic sectional view taken along the line II—II of FIGURE 1;

FIGURE 3 shows schematically a solid particle after it has been separated from the suspension and having an adhering film of liquid;

FIGURE 4 shows schematically the solid particle after it has been dried and the liquid film has been evaporated;

FIGURE 5 shows schematically a solid particle surrounded by a film of moisture and a coating material;

FIGURE 6 shows the same particle of FIGURE 5 after being dried; and

FIGURE 7 illustrates the same dried solid particle of FIGURE 6, but having a film of fat adhering thereto.

Referring now to the drawings wherein like reference symbols indicate the same parts throughout the various views, FIGURE 1 shows one form of an apparatus for carrying out the process of the present invention. This apparatus comprises a closed cylindrical container 1 with the central longitudinal axis thereof being positioned vertically. Mounted within the container 1 and rotatable about the central longitudinal axis is a rotor 2 having a plurality of scoop blades 3 on the ends of radially extending arms 4.

If the substance being processed is very viscous the inner surface of the container 1 is smooth. But if the substance is not very viscous the inner surface can be provided with either longitudinal or both longitudinal and circumferential ribs, as indicated at 5. The inner surface of this container can also be provided with a riffled surface.

A liquid suspension which is to be processed is shown in a tank 6 which is connected through the pump 7 to the bottom of the container 1, at 8. The rotor 2 is rotated by an electric motor 9 mounted on the top of the container 1.

The bottom of the container 1, indicated at 10, is provided with a plurality of openings 11 through which heated or cooled gases, such as air, are introduced.

At the upper end of the container 1 there is provided an exhaust conduit 12 through which gases and dried particles are removed from the container and are flowed through a line 13 to a centrifugal separator 14. Other forms of separators such as filters may also be used for separating the dried particles from the gases. The separator gases are then removed from the separator through the exhaust line 15 and the dried particles are removed from the bottom of the separator at 16. The dried products may either be partially removed at F or may be recirculated through the line 17 into the suspension contained in the tank 6.

A branched conduit 18 is provided which connects to the suspension delivery line 8. Additional materials may be added through this branch conduit line including heated gases.

The second branch conduit 19 connects to the exhaust conduit 12 for introducing cold air or other material to the solid particles as they leave with the gases.

In order to carry out the process of the present invention, heated air at a temperature of 100–250° C. is introduced into the container 1 through the openings 11 in the bottom of the container, or may be introduced through the branch conduit 18 together with the suspension being delivered to the bottom of the container. The rapid rotation of the rotor creates a plurality of vortices in the atmosphere within the container. The liquid suspension is then introduced in the bottom or sides of the container under the action of the pump 7. The suspension is immediately vigorously agitated and is sub divided into small droplets which comprise the solid particles having liquid films adhering thereto. These solid particles are then contacted by the heated gases within the vortices and the liquid films are evaporated and the particles dried in 1 to 1.5 seconds.

The gases are then withdrawn through the exhaust conduit 12 at a temperature of about 60° C. although the exhaust gases may range from 50–100° C. These exhaust gases have entrained therein the dried solid particles and are flowed through the line 13 into the centrifugal separator 14 wherein the separated gases are discharged at 15 and the dried solid particles discharged at 16.

In this manner, suspensions containing 60% of liquid can have their liquid content reduced to about 10% so that even with relatively small apparatus the yield of this process can be measured in tons and the process is feasible for industrial purposes.

When the suspension is difficult to process or the liquid content is more than 60%, a portion of the dried solids can be returned through the line 17 to be recirculated into the suspension in the tank 6 so as to maintain the required proportion of solids to liquids in the suspension.

The process of the present invention has been particularly useful for the preparation of foodstuffs from brewer's yeast wherein the process essentially comprises the mixing of soybeans and perhaps dried skim milk with sour whey to produce the foodstuff. Soya meal contains valuable proteins in different forms of which finely disintegrated forms are particularly valuable in such a foodstuff. In this invention the disintegration of the protein is advantageously promoted by the sudden and abrupt flash heating to which these droplets are subjected.

During the application of this process it has also been determined that those temperatures which are usually injurious to vitamins can be rendered harmless if the time during which particles containing the vitamins is greatly reduced and the interiors of the solid particles are protected from the heat by adherent films of moisture. It has also been advantageous to coat the fine globules immediately after they have been separated from the suspension with a relatively dry material such as wheat flour which has been sufficiently disintegrated by the vortices to enable the dry material to cling to the globules and thus assist in the drying process. Further, it has been found that a gas permeable coating of such added materials such as illustrated at *b* in FIGURE 6 will also protect the solids in the droplet.

In order to disclose several specific embodiments of the process of the present invention, several operating examples will be set forth in detail. It is to be understood that these examples are not limitative of the invention, but are only illustrative thereof.

Example 1

Liquid yeast containing about 80% water and 20% solids is mixed with relatively dry wheat flour paste in an agitated air atmosphere having a temperature of 250° C. in the container so as to produce in the limited time of mixing and with preservation of the vitamin content a dried product of only 2–10% water which will be sufficient to stabilize the vitamins for a relatively long period of time. The vaporizing temperature was 80° C. and liquid was removed at a rate of 200 kg./hour.

This unexpected result can be attributed to the existence of air currents of high kinetic energy and rapidly changing velocities in the vortices formed in the closed container. In these vortices individual yeast particles are coated with the added materials in such a manner so as to protect the yeast against the heat on the exterior thereof. The coating thus serves as heat insulation. The yeast protein during this process is so effectively protected that on the one hand there will be no vitamin losses and on the other hand the preservation of the entire mixture will be assured.

It has been found that a particularly valuable product can be obtained if the mixture being exhausted from the closed container is cooled by cold air introduced at 19 together with an admixture of fat. The fat is best added to the insulating film on the yeast particles after they have been contacted by the cold air and should be in such an amount that each particle of yeast, as shown in FIGURE 7, will have a porous insulating film *b* which will have absorbed thereon a layer of fat *c* but without the formulation of any globules of fat. The added animal or vegetable fat is securely attached to the surfaces of the porous particles and thus ensures the preservation of the thin film of water on the surface of the particle because the covering of fat will prevent the absorption of additional moisture. It would also be possible to introduce the cold air and fat into the upper portion of the container 1 through the cylindrical walls thereof.

Example 2

During the preparation of starch paste from wheat flour the paste is obtained in a moist condition. The paste possesses all of its original properties and particularly its ability to rise during baking.

Such a paste can be utilized in the two following ways:

(1) For the production of glutamic acid and in the sauce industry. For this purpose the moist paste is dried in rotating drums with loss of its original properties. This, however, is of no consequence for its intended purposes.

(2) For improving the baking characteristics of wheat flour.

Since the original properties of the paste must be completely preserved when used for purpose (2), the paste must always be used in a moistened condition. This has the disadvantage of necessitating its immediate use because the moist paste quickly deteriorates. As a result, repeated attempts have been made to dry the paste without disruption of its original properties.

The preparation of such a paste in dry condition by vacuum drying is old and well known, but the process is expensive.

In several applications, particularly in Australia and England, such pastes have been dried by rotary dryers but not without some alteration of their original properties. For the preservation of the original properties, the drying of the paste must be very carefully carried out. This is accomplished in the present process although the temperatures employed in this process are far above those generally considered permissible for the drying of such pastes. Previously, temperatures between 100–120° C. have been used in the continuous process.

In order to facilitate the introduction into the apparatus of the original 70% liquid content paste obtained by the conversion of wheat flour into starch, dried paste was added thereto until the mixture acquired a moist, crumbly consistency. The initial proportions were 13 kg. dry paste to 12 kg. wet paste. The dry paste was then obtained and returned in such amounts to the original tank that a moist, crumbly material is obtained. The final product had an 80% protein content and a liquid content of only 10% as compared to a liquid content of 35% at the beginning of the treatment.

It is therefore apparent that the present invention discloses a process for the separation of liquid suspensions without destroying any of the inherent properties therein. The process has a particular application in the manufacture of food stuffs where the retention of all nutritional values of the ingredients is a prime objective. The apparatus disclosed herein is only one form for carrying out this process, but has the advantage of being compact, occupying a minimum of space, and producing a sufficiently high yield so that the process is feasible for industry.

It will be understood that this invention is susceptible to modification in order to adapt it to different usages and conditions and, accordingly, it is desired to comprehend such modifications within this invention as may fall within the scope of the appended claim.

What is claimed is:

1. In a process for the separation and removal of solid particles suspended in a liquid, the steps comprising introducing heated gases at a temperature of from 100° C. to 250° C. into a closed container, beating portions of the atmosphere in the closed container to form a plurality of vortices in the heated gas therein, introducing a suspension of solid particles in a liquid into the closed container so that the suspension is separated into at least solid particles with films of liquid adhering thereto by the forces generated in the vortices formed in the heated gases, and withdrawing the gases and dried particles with said gases being at a temperature of from 50° C. to 100° C. the separated solid particles being subjected to flash heating from heated gases for from 1 to 1.5 seconds to evaporate the liquid films therefrom.

References Cited

UNITED STATES PATENTS

| | | | |
|---|---|---|---|
| 2,333,333 | 11/1943 | Peebles et al. | 159—48 X |
| 1,964,858 | 7/1934 | Peebles | 159—48 X |
| 2,542,270 | 2/1951 | Zahm | 159—6 |
| 2,974,725 | 3/1961 | Samesreuther et al. | 159—6 |
| 3,067,812 | 12/1962 | Latinen et al. | 159—6 |
| 1,795,495 | 3/1931 | Lavett | 210—374 |
| 2,560,807 | 7/1951 | Lobo | 23—48 |
| 3,053,615 | 9/1962 | Steinert | 159—48 |
| 3,126,289 | 3/1964 | Spilman et al. | 159—48 |
| 3,275,420 | 9/1966 | Tchouriline-Kissileff | 159—48 |

FOREIGN PATENTS

| | | |
|---|---|---|
| 25,634 | 1897 | Great Britain. |
| 11,064 | 1903 | Great Britain. |
| 24,408 | 1903 | Great Britain. |

NORMAN YUDKOFF, *Primary Examiner.*

J. SOFER, *Assistant Examiner.*